United States Patent [19]

Gugle

[11] Patent Number: 4,650,044

[45] Date of Patent: Mar. 17, 1987

[54] GAS-CUSHION SHOCK ABSORBER AND METHOD OF MAKING SAME

[75] Inventor: James E. Gugle, Crystal Lake, Ill.

[73] Assignee: Illinois Tool Works Inc., Chicago, Ill.

[21] Appl. No.: 698,067

[22] Filed: Feb. 4, 1985

[51] Int. Cl.$^4$ ............................................. F16F 9/43
[52] U.S. Cl. ............................ 188/322.21; 267/64.28
[58] Field of Search ........... 188/269, 314, 315, 322.21, 188/322.5; 267/64.28

[56] References Cited

U.S. PATENT DOCUMENTS

| | | | |
|---|---|---|---|
| 2,367,977 | 1/1945 | Thornhill | 188/269 X |
| 2,774,446 | 12/1956 | de Carbon | 188/322.21 |
| 4,372,429 | 2/1983 | Marx | 267/64.15 X |
| 4,443,926 | 4/1984 | Pearson et al. | 188/315 |
| 4,566,565 | 1/1986 | Wicke | 188/322.21 |

Primary Examiner—Duane A. Reger
Attorney, Agent, or Firm—J. P. O'Brien; T. W. Buckman

[57] ABSTRACT

There is disclosed a gas-cushion shock absorber wherein a sealed uninflated cushion bag containing gasifiable material is initially assembled within a hydraulic reservoir of the shock absorber whereupon the gasifiable material is activated for producing sufficient gas for inflating the bag.

13 Claims, 8 Drawing Figures

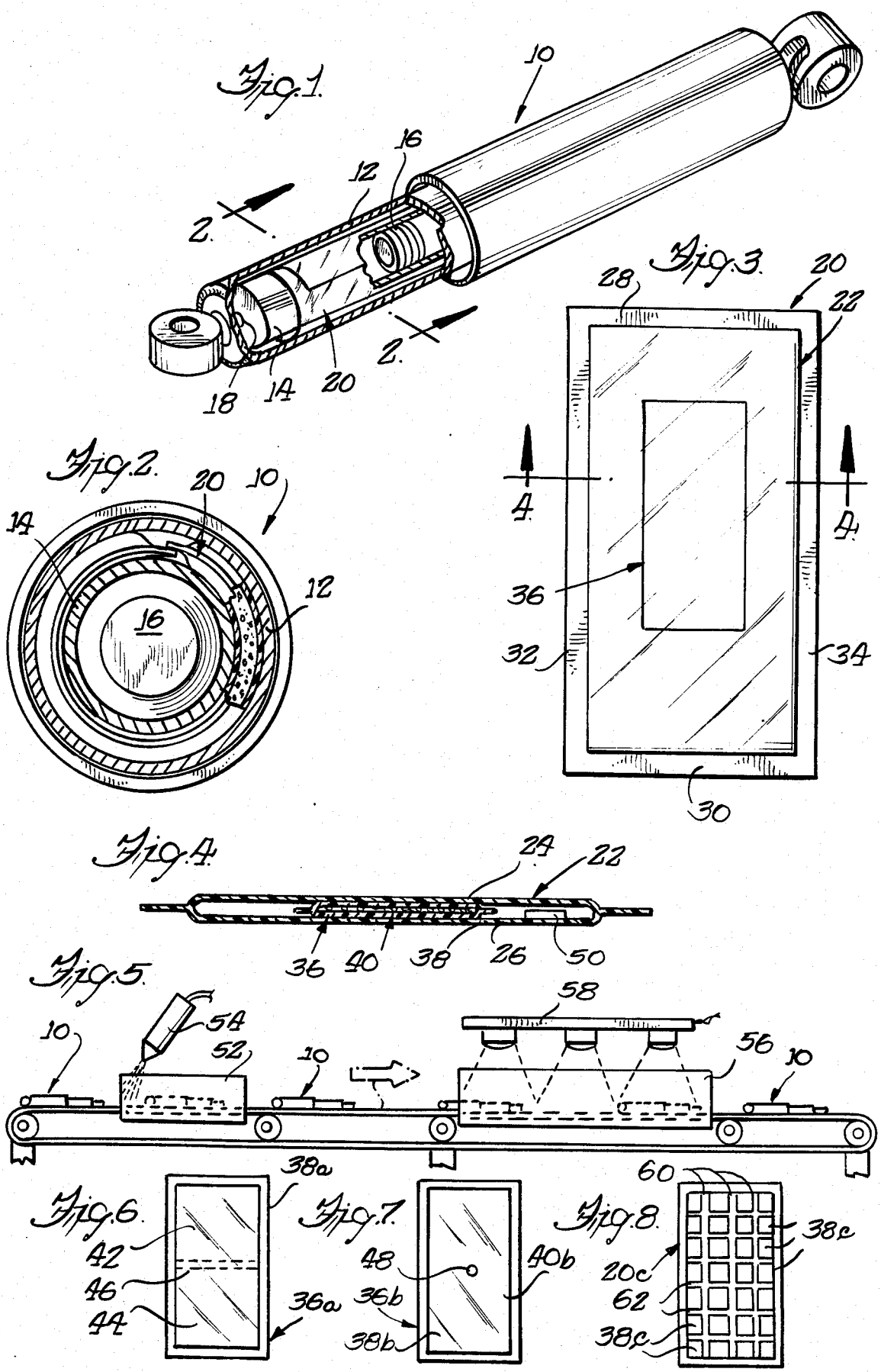

GAS-CUSHION SHOCK ABSORBER AND METHOD OF MAKING SAME

The present invention relates to novel shock absorbers and more particularly to novel gas-cushion shock absorbers and parts thereof and a novel method of making the same.

BACKGROUND OF THE INVENTION

As is well known, shock absorbers of the type commonly used in automotive vehicles, aircraft and the like include a hydraulic cylinder and piston operating within a reservoir and a valve for controlling the flow of hydraulic fluid between the cylinder and the reservoir. In addition, a sealed gas filled cushion has been installed in the reservoir to occupy the space not filled by the liquid so as to minimize any possibility of gas or air mixing with the hydraulic liquid and interfering with the proper operation of the shock absorber, also to match the metal volume of the extending or piston rod in extension. Problems have been encountered in the production of such heretofore suggested gas-cushion shock absorbers because the gas filled bags are difficult to handle and assemble into the limited space within the reservoir and around the cylinder.

SUMMARY OF THE INVENTION

It is an object of the present invention to provide a novel gas-cushion shock absorber constructed for easy and economical manufacture and a novel method of making the same.

A more specific object of the present invention is to provide a novel shock absorber and method of the above-described type wherein the cushion comprising a bag is assembled within the resveroir before being inflated for facilitating such assembly.

Another object of the present invention is to provide a novel gas-cushion structure for shock absorbers comprising an initially uninflated bag and means adapted for inflating the bag after it has been assembled within the shock absorber.

A still more specific object of the present invention is to provide a novel gas-cushion of the above-described type comprising a bag which is initially seadled in an uninflated condition and which contains a substance or device activateable to provide a gas for inflating the bag after it has been assembled within a shock absorber.

In accordance with the present invention, a gasifiable substance contained in a rupturable package is placed in a flexible bag of plastic or the like after which the bag is sealed. The sealed uninflated bag is then installed in a shock absorber reservoir. The gasifiable substance and package are such as to be activated upon being heated so as to produce sufficient gas to inflate the bag to the desired super atmospheric pressure.

Other objects and advantages of the present invention will become apparent from the following description.

BRIEF DESCRIPTION OF THE DRAWINGS

FIG. 1 is a perspective view, partially broken away, showing a shock absorber incorporating features of the present invention;

FIG. 2 is a sectional view taken along line 2—2 in FIG. 1;

FIG. 3 is a plan view of an uninflated gas cushion including a bag containing a package of a gasifiable substance incorporating features of the present invention prior to assembly into the shock absorber;

FIG. 4 is a sectional view taken along line 4—4 in FIG. 3;

FIG. 5 is a schematic view showing a portion of the novel method of manufacturing shock absorbers in accordance with the present invention;

FIG. 6 shows a gasifiable substance package incorporating a modified form of the present invention; and FIG. 7 shows another gasifiable substance package incorporating still another modification of the present invention.

FIG. 8 is a plan view on a reduced scale of a gas cushion incorporating a further modified form of the present invention.

DETAILED DESCRIPTION OF ILLUSTRATED EMBODIMENTS

In FIGS. 1 and 2 there is shown a gas cushion shock absorber 10 incorporating features of the present invention. The shock absorber comprises a reservoir 12 for hydraulic fluid, a cylinder 14 mounted within the reservoir, and a piston 16 relatively slidable within the cylinder. A valve 18 is provided in the cylinder for controlling the flow of fluid between the cylinder and the reservoir during operation of the device. The foregoing elements of the shock absorber and the mode of operation are all well known and need not be described in further detail.

The shock absorber 10 also includes a gas cushion 20 constructed in accordance with the present invention. As shown best in FIGS. 3 and 4, the cushion 20 comprises a sealed bag 22 preferably made from a tough resilient plastic material which is sufficiently thick to prevent the bag from rupturing or leaking during normal operation of the shock absorber. By way of example, the bag 22 may be made from nylon sheet material three mils thick. As shown in the drawings, the bag 22 comprises opposite sides or sheets 24 and 26 which are closely spaced or substantially together when the bag is in the uninflated condition. In the embodiment shown, these sheets are joined and sealed together at heat sealed margins 28, 30, 32 and 34.

As shown in FIG. 4, the bag in its uninflated condition is substantially flat and any air space there may be is at normal atmospheric pressure. However, in accordance with the present invention, the cushion 20 further comprises a device 36 placed within the bag 20 prior to the time when the bag is sealed. The device 36 comprises a small package or bag 38 containing a substance 40 adapted to be gasified as described more in detail below.

In one embodiment of the present invention, the gasifiable device has its package or bag 38 formed from a relatively thin rupturable material such, for example only, as a one-half mil polyethylene sheet. In accordance with one form of the invention, the gasifiable substance 40 comprises the mixture of yeast, glucose and water which will produce $CO_2$ gas when heated.

In another form of the invention, the gasifiable substance 40 comprises a predetermined amount of ammonium carbonate and an equal amount of copper sulphate. For example, the package may contain one gram each of these ingredients. These chemicals and the mixture mentioned in the preceding paragraph are such that when heated, sufficient gas will be produced to rupture the package or bag 38 and inflate the bag 22 to a desired elevated or super atmospheric pressure for providing the desired cushion function.

The production of the CO$_2$ gas from the yeast, glucose and water mixture is accomplished by heating the mixture to at least 105 degrees Farenheit while the copper sulphate and ammonium carbonate mixture should be heated to at least 150 degrees Farenheit. Preferably, the heating of the substances is accomplished in accordance with the method of the present invention described more in detail below.

In FIG. 6, there is shown a gas producing device 36a incorporating a modified embodiment of the present invention. The device 36a is similar to the device 36 described above as indicated by the application of identical reference numerals with the suffix a added. It is, of course, understood that the device 36a may be substituted in the cushion bag 22 for the previously described package 36.

This embodiment differs in that the bag 38a of the package 36a is divided into a plurality of compartments 42 and 44 by releaseable means such as a pressure sensitive tape 46. It is further contemplated that, in this embodiment, the gasifiable material will include a first chemical sealed in the segment 42 of the bag and a second chemical normally reactive with the first chemical and sealed in the pocket 44 of the bag. For example, sodium bicarbonate (NaHCO) may be placed in the end or pocket 42 of the bag 38a and a suitable acid such as sulphuric acid may be placed in the opposite end 44 of the package. The adhesive of the pressure sensitive tape 46 is formulated so as to release at elevated temperatures of, for example, between about 140°–150° Farenheit.

When the package is heated and the tape releases, the acid and the sodium bicarbonate will mix so as to produce sufficient CO$_2$ gas to rupture the bag 38a and inflate the bag 22 of the cushion.

In FIG. 7, there is shown still another embodiment of a gas producing device 36b incorporating features of the present invention. Again it is to be understood that the device 36b may be substituted for the device 36 in the gas-cushion assembly described above and that elements of the device corresponding to those previously described are designated by the same reference numeral with the suffix b added. In this embodiment, the package or bag 38b is provided with a dark colored or black heat absorbing dot 48. The bag which, for example, may be formed from one or two mil polyethylene material contains a gasifiable substance 40b which may be of the above-described chemicals or simply a chemical such as ammonium carbonate. Such a chemical will start to sublime at about 20° centigrade to H$_2$O, ammonia gas (NH$_3$) and carbon dioxide (CO$_2$). During the manufacturing process, the cushion bag is subjected to infrared radiation and the black dot 48 acts to absorb sufficient heat to melt the polyethylene material to provide a vent to permit the escape of the gas from the bag 38b.

When this form of the invention is used, preferably means is provided in the bag 22 of the cushion for absorbing the water vapor leaving the CO$_2$ and NH$_3$ for expansion of the bag. This means may, for example, be in the form of a tape of copper sulphate which, for convenience, is shown as element 50 in FIG. 4.

FIG. 8 shows a gas-cushion 20c incorporating another modified form of the present invention as indicated by the application of identical reference numerals with the suffix c added to corresponding elements. In this embodiment, the bag 22c is initially partially filled with a suitable gas such as sulphur hexaflouride (SF$_6$) and also chemicals such as ammonium carbonate which will give off a gas when heated. The bag is then cross-hatched or heat sealed along a plurality of longitudinal and transverse lines 60 and 62 leaving many individual small partially inflated pockets designated 38c therebetween. When the cushion is heated in the manner described below during final processing of the shock absorber, the chemical in these pockets will gasify so as to complete the inflation of the bag.

In accordance with the method of the present invention, the shock absorber 10 may be produced in the following manner. The basic metal components of the shock absorber including the cylinder 14, piston 16 and valve 18 are manufactured in a known manner and assembled with the reservoir 12 which initially has an open end. Then the uninflated cushion 20 is inserted in the cylinder 14 after which the reservoir is filled with hydraulic fluid and an end is welded or otherwise secured to the body of the reservoir 12. As previously indicated, the bag 22 of the cushion may be substantially flat and completely uninflated. However, if desired, the bag 22 could be partially inflated with a standard gas used in prior cushions such as sulphur hexaflouride (SF$_6$) with the gas producing device 36 or the other modifications described above being used to complete the inflation after the bag is assembled in the shock absorber.

Referring now to FIG. 5, it is seen that the process contemplates that after assembly of the previously described parts of a shock absorber has been accomplished, further processing of shock absorbers includes the application of paint at a work station 52 by any suitable means such as sprayer 54. Then the painted shock absorbers are transported to a work station 56 at which they are heated in an oven or by any suitable heating means such as radiant heater 58. The temperature to which the shock absorbers are heated is sufficient to bake the paint which has been applied to the exterior surface. At the same time, the temperature is sufficient to activate the gas producing device within the cushion bag 22 so as fully to inflate the bag to the desired pressure. In other words, the shock absorbers are heated at least to any of the temperatures set forth above in connection with the descriptions of the various gas producing devices so as to activate the respective devices.

While preferred embodiments of the present invention have been disclosed and described herein, other modifications can be made without departing from the spirit and scope of the appended claims.

The invention is claimed as follows:

1. A gas-cushion shock absorber comprising a hydraulic fluid reservoir, cylinder and piston means assembled with said reservoir, valve means for controlling flow of hydraulic fluid between said cylinder and said reservoir, and initially at least partially uninflated gas-cushion means within and partially filling said reservoir, said gas-cushion means comprising an uninflated sealed bag and normally inactive non-pressurized gasifiable means within said bag activatable upon the application of heat thereto for producing a gas within the bag for inflating the bag to a desired super atmospheric pressure, said gasifiable means comprising an initially sealed generally flattened package containing gasifiable chemical material, said package being rupturable upon gasification of said chemical material for pressurizing said sealed bag.

2. A gas-cushion shock absorber as defined in claim 1, wherein said gasifiable chemical material comprises a mixture of yeast, glucose and water for producing carbon dioxide gas upon being heated.

3. A gas-cushion shock absorber as defined in claim 1, wherein said gasifiable chemical material comprises ammonium carbonate which will sublime to provide a gas upon being heated.

4. A gas-cushion shock absorber as defined in claim 3, wherein said gasifiable chemical material comprises copper sulphate along with said ammonium carbonate.

5. A gas-cushion shock absorber as defined in claim 1, wherein said gasifiable chemical material comprises sodium bicarbonate and an acid reactive therewith and said package comprising heat releaseable means for maintaining the sodium bicarbonate and acid separate from each other until heated.

6. A gas-cushion of the type described comprising a sealed at least partially uninflated bag and normally inactive non-pressurized gas producing means within said bag, a non-pressurized generally flat package within said bag containing gasifiable material activatable upon being heated after the bag is sealed for producing gas within the bag for inflating the bag to a desired super atmospheric pressure, said package being rupturable upon heating and gasification of said material for pressurizing said bag.

7. A gas-cushion as defined in claim 6, wherein said gasifiable material comprises a mixture of yeast, glucose and water.

8. A gas-cushion as defined in claim 6, wherein said package comprises a plurality of separate pockets and heat releaseable seal means separating said pockets from each other, and said gasifiable material comprises different chemicals respectively separately disposed in said pockets and reactable together upon release of said seal means to produce said gas.

9. A gas-cushion as defined in claim 6, wherein said gasifiable material comprises ammonium carbonate.

10. A gas-cushion as defined in claim 9, wherein said gasifiable material comprises copper sulphate.

11. A gas-cushion as defined in claim 6, wherein said package is formed from a meltable material and includes a heat absorbing area for melting prior to the remainder of the package to provide a vent for the gas.

12. A gas-cushion as defined in claim 6, wherein said bag comprises a plurality of criss-cross seals separating said bag into a plurality of separate and discrete pockets, said gasifiable material being disposed in a plurality of said pockets.

13. A gas-cushion as defined in claim 6, comprising a gas within said bag in addition to said gasifiable material for only partially inflating the bag prior to the gasifiable material being activated.

* * * * *